(12) United States Patent
Yanagawa et al.

(10) Patent No.: US 6,731,662 B2
(45) Date of Patent: *May 4, 2004

(54) LASER LIGHT INTENSITY CONTROLLER

(75) Inventors: Naoharu Yanagawa, Tokorozawa (JP); Fumihiko Sano, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 13 days.

This patent is subject to a terminal disclaimer.

(21) Appl. No.: 09/968,907

(22) Filed: Oct. 3, 2001

(65) Prior Publication Data

US 2002/0044577 A1 Apr. 18, 2002

(30) Foreign Application Priority Data

Oct. 3, 2000 (JP) ........................................ 2000-303075

(51) Int. Cl.$^7$ .............................. H01S 3/13; G11B 7/00
(52) U.S. Cl. .................................. 372/29.014; 369/116
(58) Field of Search .......................... 372/29.014, 38.02; 369/44, 116

(56) References Cited

U.S. PATENT DOCUMENTS

| | | | | |
|---|---|---|---|---|
| 4,984,229 A | * | 1/1991 | Nedvidek | 369/44.24 |
| 5,274,491 A | * | 12/1993 | Collins et al. | 359/200 |
| 5,519,679 A | * | 5/1996 | Gage | 369/44.34 |
| 5,539,718 A | * | 7/1996 | Hoshi et al. | 369/100 |
| 5,561,655 A | * | 10/1996 | Gage et al. | 369/44.26 |
| 5,594,711 A | * | 1/1997 | Koyama | 369/44.37 |
| 5,657,307 A | * | 8/1997 | Taneya et al. | 369/116 |
| 5,781,304 A | * | 7/1998 | Kotidis et al. | 359/511 |
| 6,026,070 A | * | 2/2000 | Miura et al. | 369/112.16 |
| 6,144,483 A | * | 11/2000 | Allen et al. | 359/305 |
| 6,314,061 B1 | * | 11/2001 | Miyaoka | 369/13.17 |
| 6,396,775 B1 | * | 5/2002 | Nakajima | 369/13.13 |
| 2002/0044576 A1 | * | 4/2002 | Yanagawa et al. | 372/29.014 |

* cited by examiner

Primary Examiner—Paul Ip
Assistant Examiner—Phillip Nguyen
(74) Attorney, Agent, or Firm—Sughrue Mion, PLLC

(57) ABSTRACT

A laser light intensity controller includes a polarizing beam splitter for passing most of one of an x-direction polarization component perpendicular to a direction in which a laser beam emitted from a light source travels and a y-direction polarization component parallel with the traveling direction and for reflecting a little portion of the one polarization component as monitoring light, and a photodetector for receiving the reflected monitoring light to generate a light intensity signal. The controller drives the light source in accordance with the light intensity signal. The photodetector reflects the other of the x-direction polarization component and the y-direction polarization component and is not sensitive thereto, and absorbs the one polarization component and is sensitive thereto.

30 Claims, 5 Drawing Sheets

LASER LIGHT INTENSITY CONTROLLER

BACKGROUND OF THE INVENTION

1. Field of the Invention

The present invention relates to a laser light intensity controller which is applied to an optical apparatus.

2. Description of the Related Background Art

An optical pickup apparatus, which is used for reading information from an optical disc or writing information into an optical disc, is provided with a laser light intensity controller which monitors a portion of a laser beam emitted from a light source to irradiate the disc with the laser beam with an appropriate light intensity.

In the laser light intensity controller, for preventing a reduction in the light intensity of a laser beam irradiated to a disc caused by the rotation of a polarization plane of the laser beam, due to a change in temperature which affects optical parts such as a light source, a portion of P-polarization component within the laser beam emitted from the light source, if the laser beam irradiated to the disc is the P-polarization component, is separated by a polarizing beam splitter, and received by a front monitor, which serves as a light receiving means, to drive the light source in response to an output signal of the front monitor (Laid-open Japanese Patent Application No. 7-326064).

However, the conventional laser light intensity controller has a problem in a large number of required optical parts and a complicated optical system.

SUMMARY OF THE INVENTION

It is therefore an object of the present invention to provide a laser light intensity controller which is capable of stably controlling the light intensity of a laser beam emitted from a light source of an optical pickup apparatus in a simple configuration, even if the plane of polarization of the laser beam rotates.

The present invention provides a laser light intensity controller for controlling a light intensity of a laser beam emitted from a light source of an optical apparatus. The laser light intensity controller includes a polarization separating device for passing therethrough most of one of an x-direction polarization component perpendicular to a direction in which a laser beam emitted from the light source travels and a y-direction polarization component parallel with the traveling direction and for reflecting a little portion of the one polarization component as monitoring light, a first light receiving device for receiving the monitoring light reflected by the polarization separating device to generate a first light intensity signal indicative of the received light intensity, and a driving device for driving the light source in accordance with the first light intensity signal, wherein the first light receiving device reflects the other of the x-direction polarization component and the y-direction polarization component and is not sensitive to the polarization component, and the first light receiving device absorbs the one polarization component and is sensitive to the polarization component.

The present invention also provides a laser light intensity controller for controlling a light intensity of a laser beam emitted from a light source of an optical apparatus. The laser light intensity controller includes a first polarization separating device for passing therethrough most of one of an x-direction polarization component perpendicular to a direction in which a laser beam emitted from the light source travels and a y-direction polarization component parallel with the traveling direction, and a little portion of the other polarization component, and for reflecting a little portion of the one polarization component and most of the other polarization component as monitoring light, a second polarization separating device for separating the one polarization component and the other polarization component from the monitoring light, a first light receiving device for receiving the one polarization component separated by the second polarization separating device to generate a first light intensity signal indicative of the received light intensity, a second light receiving device for receiving the other polarization component separated by the second polarization separating device to generate a second light intensity signal indicative of the received light intensity, a driving device for driving the light source in accordance with the first light intensity signal, and a control device for calculating effective output laser beam power of the light source in accordance with the first and second light intensity signals to control the driving device such that the effective output laser beam power is smaller than maximum rated power of the light source.

The present invention further provides a laser light intensity controller for controlling a light intensity of a laser beam emitted from a light source of an optical apparatus. The laser light intensity controller includes a polarizing beam splitter for passing therethrough most of one of an x-direction polarization component perpendicular to a direction in which a laser beam emitted from the light source travels and a y-direction polarization component parallels with the traveling direction and for reflecting a little portion of the one polarization component on a polarization separating plane as monitoring light, a reflecting member formed on a surface of the polarizing beam splitter, located on a path along which the monitoring light travels, for reflecting the monitoring light such that the reflected monitoring light exits from the polarizing beam splitter through the polarization separating plane, a light receiving device for receiving the monitoring light output from the polarizing beam splitter to generate a light intensity signal indicative of a received light intensity, and a driving device for driving the light source in accordance with the light intensity signal.

DETAILED DESCRIPTION OF THE PREFERRED EMBODIMENTS

In the following, embodiments of the present invention will be described in detail with reference to the accompanying drawings.

Figure 1:
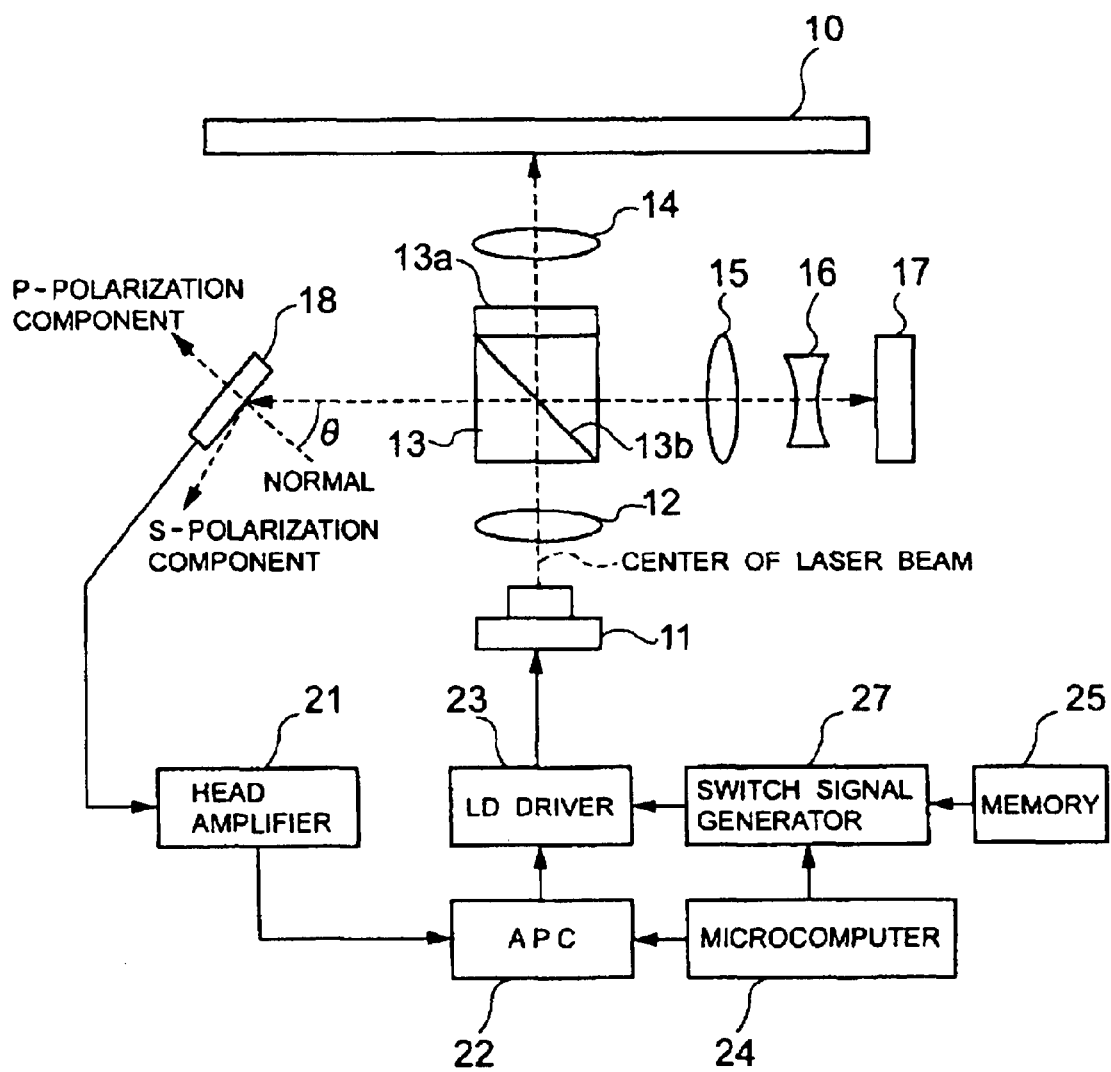
FIG. 1 is a diagram illustrating an embodiment of the present invention.

FIG. 1 illustrates the configuration of an optical pickup apparatus to which a laser light intensity controller according to the present invention is applied. The illustrated optical pickup apparatus includes a semiconductor laser device 11, a collimator lens 12, a PBS (polarizing beam splitter) 13, an objective lens 14, a condenser lens 15, a multi-lens 16, a photodetector 17, and a front monitor 18. The illustrated optical pickup apparatus writes information into an optical disc 10 or reads information recorded on the optical disc 10 with a laser beam emitted by the semiconductor laser device 11. The optical disc 10 may be, for example, DVD, DVD-R, DVD-RAM, DVD-RW, CD, and CD-R.

The semiconductor laser device 11 may be such one that emits two laser beams at different wavelengths from each other. For example, the semiconductor laser device 11 may be driven by an LD driver 23 to selectively emit a laser beam for DVD at wavelength of 650 nm and a laser beam for CD at wavelength of 780 nm.

A laser beam emitted from the semiconductor laser device 11 reaches the PBS 13 having a polarizing plate as collimated light through the collimator lens 12. The PBS 13 is disposed such that the polarizing plate 13*a* of the PBS 13 is positioned on the opposite side to the semiconductor laser device 11, i.e., on the same side as the optical disc 10. The PBS 13 passes therethrough most (for example, 90%) of a P-polarization component (an electric field component parallel with an incident plane, i.e., x-direction polarization component) incident thereon through the collimator lens 12, and reflects a little portion (for example, 10%) of the P-polarization component on a polarization separating plane 13*b*. Also, the PBS 13 passes therethrough a little portion (for example, 10%) of an S-polarization component (an electric field component perpendicular to the incident plane, i.e., a y-direction polarization component) incident thereon through the collimator lens 12, and reflects most (for example, 90%) of the S-polarization component on the polarization separating plane 13*b*. The laser beam reflected by the PBS 13 travels in a direction substantially perpendicular to a direction in which the laser beam passes through the PBS 13. The polarizing plate 13*a* converts the laser beam which has passed the PBS 13 from linearly polarized light to circularly polarized light.

The laser beam which has passed the PBS 13 having the polarizing plate 13*a* reaches the disc 10 through the objective lens 14, and is reflected by a recording surface of the disc 10. The laser beam reflected by the recording surface of the disc 10 returns to the PBS 13 through the objective lens 14 and the polarizing plate 13*a*. The polarizing plate 13*a* converts the reflected laser beam from circularly polarized light to linearly polarized light. The PBS 13 reflects the returned laser beam on the polarization separating plane 13*b*, such that the reflected laser beam reaches a light receiving surface of the photodetector 17 through the condenser lens 15 and the multi-lens 16.

The front monitor 18 is provided in a direction in which the laser beam reflected by the PBS 13 travels. The front monitor 18 includes a photodiode which has a surface covered with a transparent acrylic plate. An incident plane of the front monitor 18 is not perpendicular to but inclined to the direction in which the reflected laser beam travels. This inclination angle θ is the Brester's angle at which a P-polarization component of the laser beam is incident on the acrylic plate while an S-polarization component is reflected by the surface of the acrylic plate. Therefore, the front monitor 18 generates an electric signal corresponding to the light intensity of the laser beam incident thereon, i.e., a front monitor signal.

The front monitor 18 is connected to an APC (automatic power controller) 22 through a head amplifier 21. The APC 22 controls a drive signal level by the LD driver 23 such that the level of a front monitor signal amplified by the head amplifier 21 is equal to a reference level. The reference level takes different values when data is read from the disc 10 and when data is written into the disc 10 The value of the reference level is specified by a microcomputer 24.

For writing, recording data is read from a memory 25 and supplied to a switch signal generator 27. The switch signal generator 27 controls driving power of the LD driver 23 in accordance with the recording data. Specifically, the switch signal generator 27 forces the LD driver 23 to switch the driving power to a high level at a portion of the disc 10 on which a pit is formed, and to switch the driving power to a low level (driving power for reading) at a portion of the disc 10 on which no pit is formed.

In the optical pickup apparatus configured as described above, a drive signal generated by the LD driver 23 is supplied to the semiconductor laser device 11 which emits a laser beam having an intensity in accordance with the drive signal level. A little portion of a P-polarization component beam and most of an S-polarization component of the emitted laser are reflected by the PBS 13, and directed to the front monitor 18. As described above, the P-polarization component is incident on the front monitor 18, whereas the S-polarization component is reflected by the front monitor 18. Sensitive to the P-polarization component of the laser beam incident on the front monitor 18, the front monitor 18 generates a front monitor signal in accordance with the light intensity of the P-polarization component. The front monitor signal is amplified by the head amplifier 21, and then supplied to the APC 22.

The APC 22 generates a control signal such that the front monitor signal is equal to a reference level. Specifically, the control signal increases the level of the drive signal supplied to the semiconductor laser device 11 by the LD driver 23 when the front monitor signal is lower than the reference level, and decreases the level of the drive signal supplied to the semiconductor laser device 11 by the LD driver 23 when the front monitor signal is higher than the reference level. As a result, even if the plane of polarization of the laser beam rotates, it is possible to maintain the P-polarization component of the laser beam reaching the disc 10 through the PBS 13 at a desired intensity.

Figure 2:
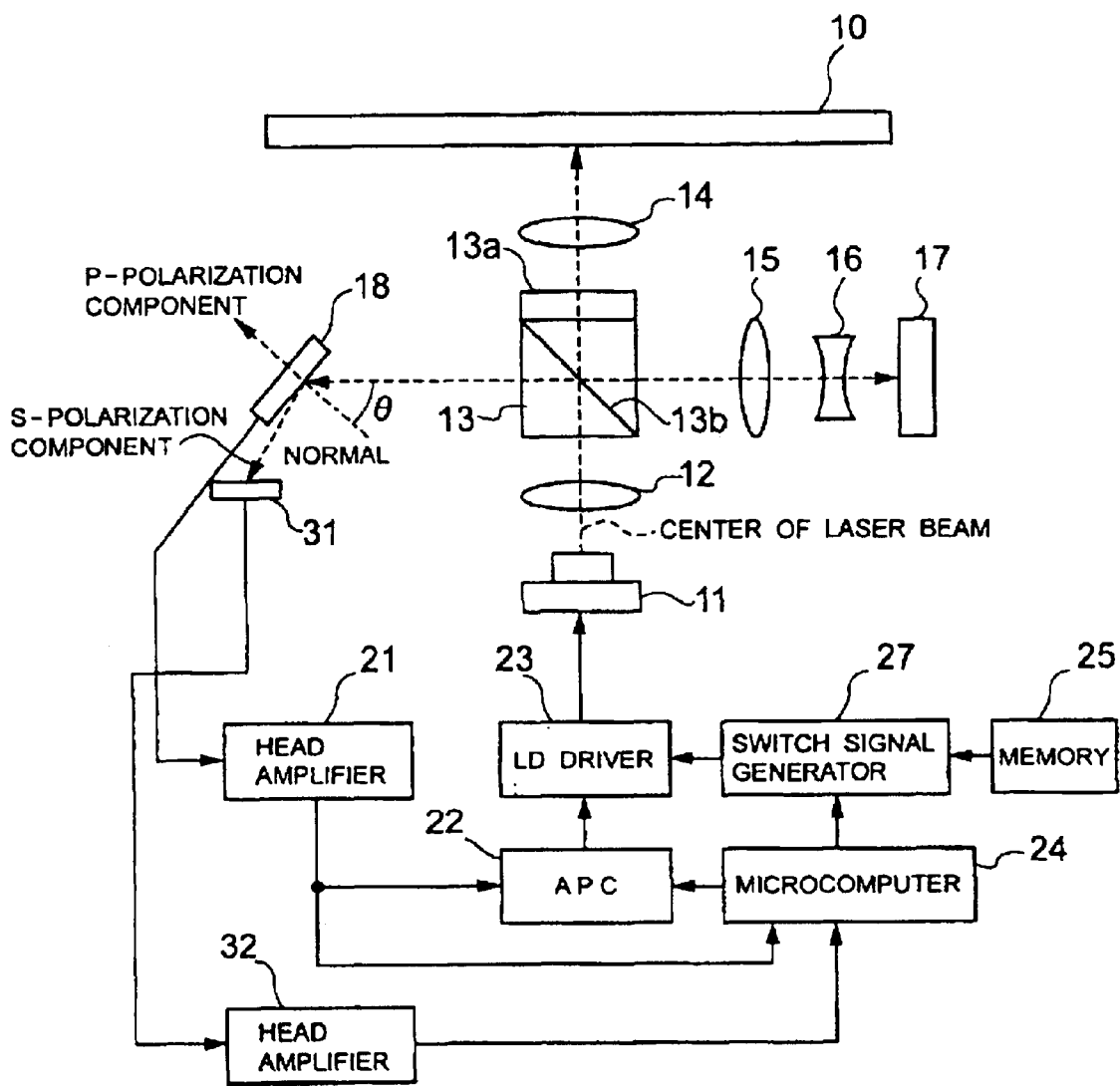
FIG. 2 is a diagram illustrating another embodiment of the present invention.

FIG. 2 illustrated another embodiment of the present invention. In an optical pickup apparatus of this embodiment, a front monitor 31 for S-polarization is provided in addition to the configuration of the optical pickup apparatus of FIG. 1. The front monitor 31 for S-polarization is disposed to receive an S-polarization component reflected by the incident plane of the front monitor 18. The front monitor 31 generates an electric signal corresponding to the light intensity of a laser beam incident thereon, i.e., an S-polarization component front monitor signal.

The front monitor 31 for S-polarization is connected to the microcomputer 24 through a head amplifier 32. The microcomputer 24 is also connected to the output of the head amplifier 21, so that it is supplied with both S-polarization and P-polarization front monitor signals.

The remaining configuration is similar to that of the optical pickup apparatus illustrated in FIG. 1.

In the optical pickup apparatus configured as illustrated in FIG. 2, a drive signal of the LD driver 23 is supplied to the semiconductor laser device 11 which emits a laser beam having an intensity in accordance with the level of the drive signal. A portion of a P-polarization component and most of an S-polarization component of the emitted laser beam are reflected by the PBS 13, and directed to the front monitor 18. As described above, the P-polarization component of the laser beam is incident on the front monitor 18, while the S-polarization component is reflected by the front monitor 18 toward the front monitor 31 for S-polarization. The front monitor 18 generates a P-polarization component front monitor signal corresponding to the light intensity of the P-polarization component of the incident laser beam. The P-polarization component front monitor signal is amplified by the head amplifier 21, and then supplied to the APC 22 and the microcomputer 24. On the other hand, the front monitor 31 for S-polarization generates an S-polarization component front monitor signal corresponding to the light intensity of the S-polarization component of the incident laser beam. The S-polarization component front monitor signal is amplified by the head amplifier 21, and then supplied to the microcomputer 24.

The APC 22 generates a control signal such that the P-polarization component front monitor signal is equal to the reference level. Specifically, the control signal increases the level of the drive signal supplied to the semiconductor laser device 11 by the LD driver 23 when the P-polarization component front monitor signal is lower than the reference level, and decreases the level of the drive signal supplied to the semiconductor laser device 11 by the LD driver 23 when the P-polarization component front monitor signal is higher than the reference level. On the other hand, the microcomputer 24 calculates effective output laser beam power generated by the semiconductor laser device 11 in accordance with the P-polarization component front monitor signal and the S-polarization component front monitor signal. For example, the microcomputer 24 adds a square of the P-polarization component front monitor signal and a square of the S-polarization component front monitor signal, and defines a square root of the addition result as the effective output laser beam power.

As the effective output laser beam power reaches a limit value which is lower than maximum rated power, the microcomputer 24 decreases the reference level which is supplied to the APC 22. A lower reference level causes the control signal generated from the APC 22 to reduce the level of the drive signal supplied to the semiconductor laser device 11 by the LD driver 23. As a result, the semiconductor laser device 11 is prohibited from emitting a laser beam having a light intensity exceeding the maximum rated power when the polarization plane of the laser beam rotates, due to the output laser beam power control for the semiconductor laser device 11 only relying on the P-polarization component front monitor signal, thereby making it possible to prevent the semiconductor laser device 11 from deteriorating.

Figure 3:
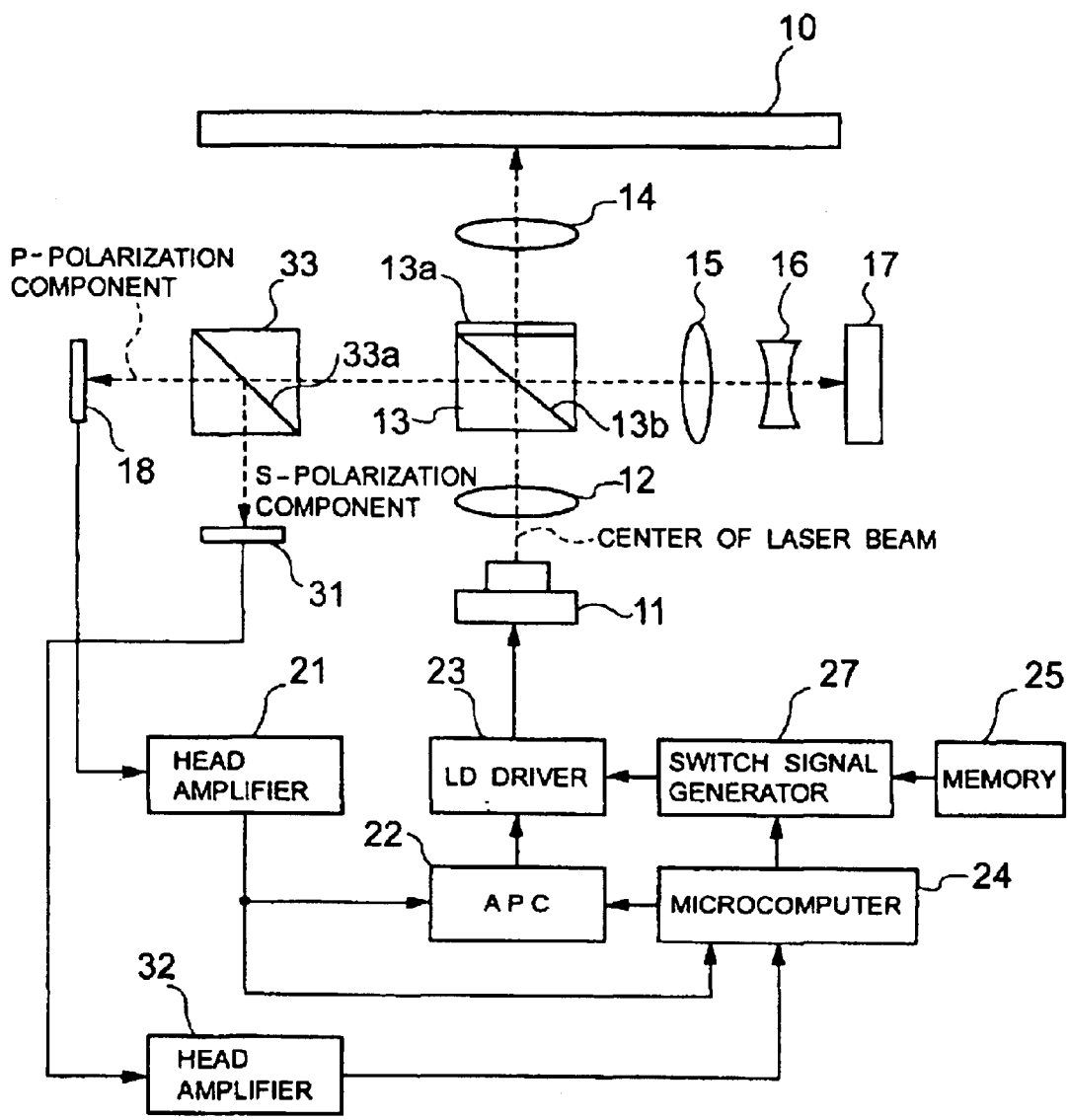
FIG. 3 is a diagram illustrating an embodiment of the present invention.

FIG. 3 illustrates a further embodiment of the present invention. An optical pickup apparatus of this embodiment is further provided with a PBS 33 in addition to the configuration of the optical pickup apparatus illustrated in FIG. 2. The PBS 33 is disposed in a direction in which the PBS 13 reflects a laser beam incident thereon from the collimator lens 12. In other words, a reflected laser beam for front monitor is incident on the PBS 33 from the PBS 13. The PBS 33 passes therethrough substantially 100% of a P-polarization component of the incident laser beam, and reflects substantially 100% of an S-polarization component of the laser beam on a polarization separating plane 33a. Reflection of the P-polarization component and passage of the S-polarization component are substantially 0%.

A front monitor 18 for P-polarization is provided in a direction in which the laser beam passes through the PBS 33. A front monitor 31 for S-polarization is provided in a direction in which the laser beam reflected by the PBS 33 travels. The front monitor 18 for P-polarization and the front monitor 31 for S-polarization are both disposed such that their light receiving surfaces are perpendicular to the incident laser beam.

The remaining configuration is similar to that of the optical pickup apparatus illustrated in FIG. 2.

In the optical pickup apparatus configured as illustrated in FIG. 3, a drive signal of the LD driver 23 is supplied to the semiconductor laser device 11 which emits a laser beam having an intensity corresponding to the level of the drive signal. A portion of a P-polarization component and most of an S-polarization of the emitted laser beam are reflected by the PBS 13. The reflected P-polarization component passes through the PBS 33 toward the front monitor 18 for P-polarization. On the other hand, the reflected S-polarization component is reflected by the polarization separating plane 33a of the PBS 33, and directed to the front monitor 31 for S-polarization.

The front monitor 18 generates a P-polarization component front monitor signal corresponding to the light intensity of the P-polarization component of the incident laser beam. The P-polarization component front monitor signal is amplified by the head amplifier 21, and supplied to the APC 22 and the microcomputer 24. On the other hand, the front monitor 31 for S-polarization generates an S-polarization component front monitor signal Corresponding to the light intensity of the S-polarization component of the incident laser beam. The S-polarization component front monitor signal is amplified by the head amplifier 32, and then supplied to the microcomputer 24. The operations of the APC 22 and the microcomputer 24 are identical to those in the device illustrated in FIG. 2, so that description thereon is omitted here.

Figure 4:
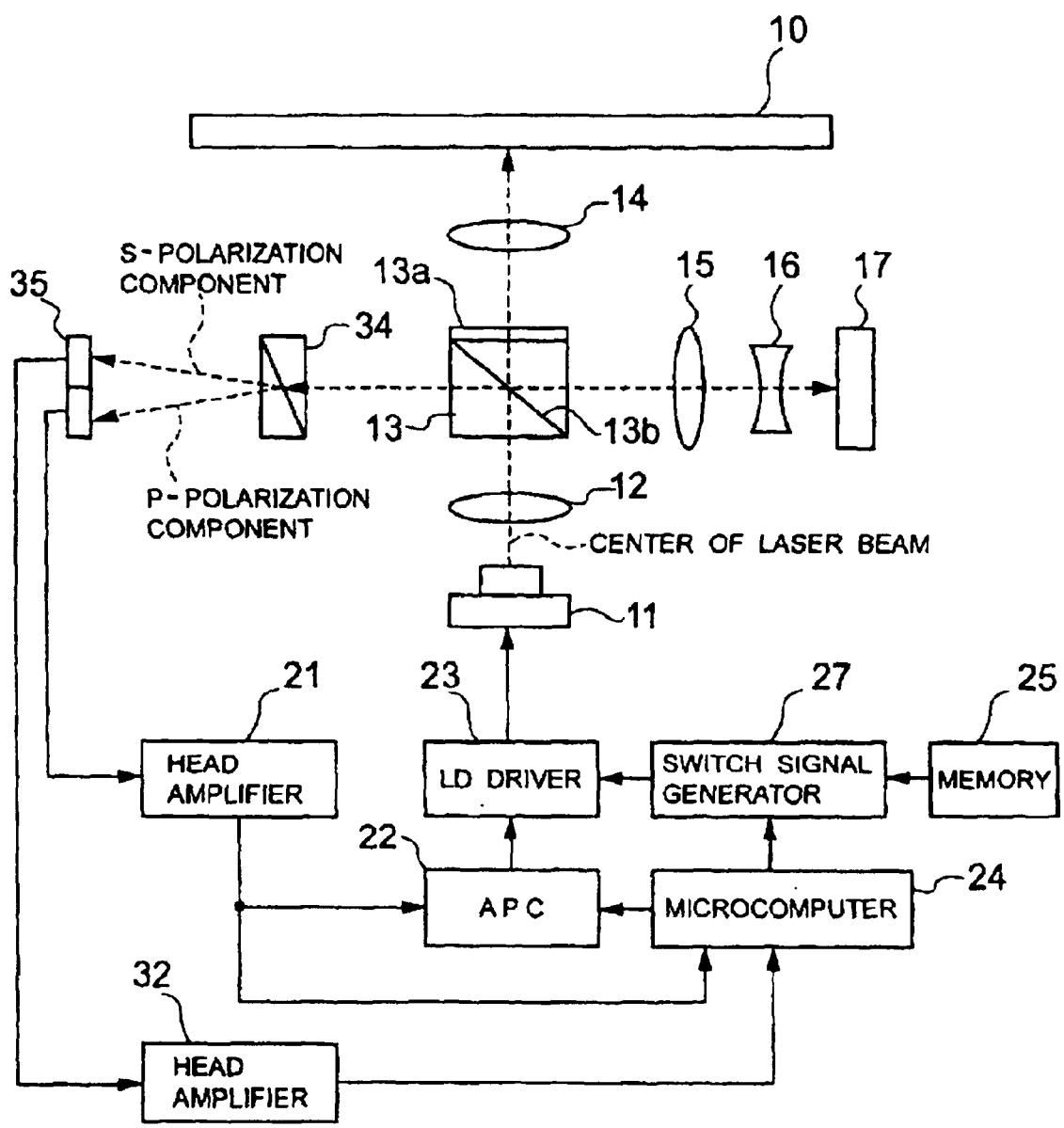
FIG. 4 is a diagram illustrating another embodiment of the present invention.

FIG. 4 illustrates a yet further embodiment of the present invention. An optical pickup apparatus of this embodiment is provided with a Wollaston prism 34 in addition to the configuration of the optical pickup apparatus illustrated in FIG. 2. Also, a front monitor 35 is provided in place of the front monitors 18, 31 provided in the device of FIG. 2.

The Wollaston prism 34 is disposed in a direction in which the PBS 13 reflects a laser beam incident thereon from the collimator lens 12. Specifically, a reflected laser beam for front monitor is incident on the Wollaston prism 34 from the PBS 13. The Wollaston prism 34 separates the incident laser beam into a P-polarization component and an S-polarization component, and emits these components in directions different from each other. The directions in which the P-polarization component and the S-polarization component are emitted are symmetric about the incident line.

The front monitor 35 has bisect light receiving surfaces, each of which generates an individual output. One light receiving surface is irradiated with the P-polarization component from the Wollaston prism 34, while the other light receiving surface is irradiated with the S-polarization component from the Wollaston prism 34. Alternatively, front monitors for P-polarization and S-polarization may be separately provided in place of the front monitor 35.

The remaining configuration is similar to that of the optical pickup apparatus illustrated in FIG. 2.

In the optical pickup apparatus configured as illustrated in FIG. 4, a drive signal of the LD driver 23 is supplied to the semiconductor laser device 11 which emits a laser beam having an intensity corresponding to the level of the drive signal. A portion of a P-polarization component and most of an S-polarization component of the emitted laser beam are reflected by the PBS 13, and separated into the P-polarization component and the S-polarization component by the Wollaston prism 34. The P-polarization component is directed to the one light receiving surface of the front monitor 35, while the S-polarization component is directed to the other light receiving surface of the front monitor 35.

The front monitor 35 individually generates a P-polarization component front monitor signal corresponding to the light intensity of the P-polarization component of the incident laser beam, and an S-polarization component front monitor signal corresponding to the light intensity of the S-polarization component. The P-polarization component front monitor signal is amplified by the head amplifier 21, and then supplied to the APC 22 and the microcomputer 24. On the other hand, the S-polarization component front monitor signal is amplified by the head amplifier 31, and then supplied to the microcomputer 24. The operations of the APC 22 and the microcomputer 24 are identical to those in the device illustrated in FIG. 2, so that description thereon is omitted here.

Figure 5:
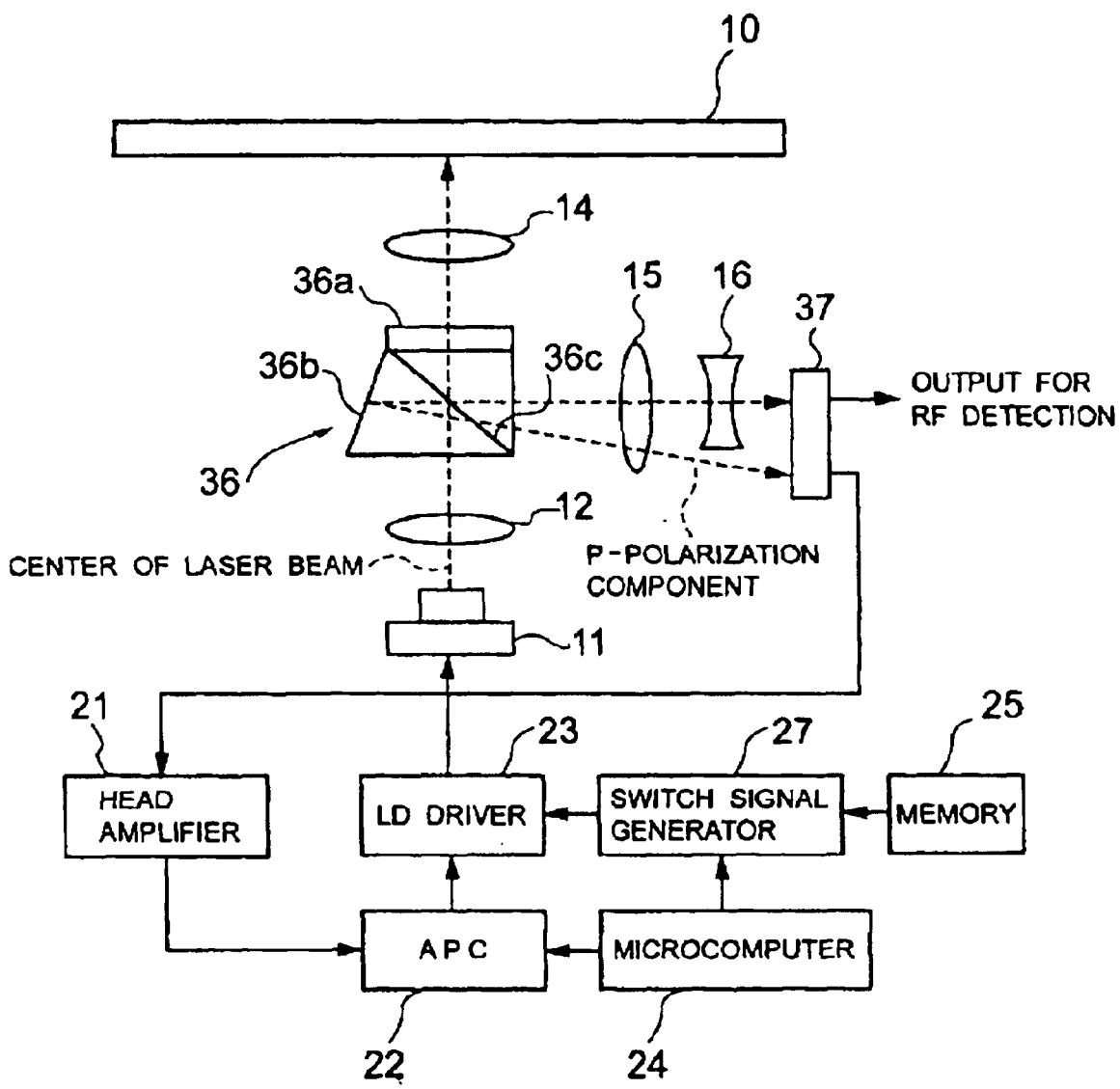
FIG. 5 is a diagram illustrating an embodiment of the present invention.

FIG. 5 illustrates a still further embodiment of the present invention. An optical pickup apparatus of this embodiment is provided with a PBS 36 having a polarizing plate and a reflective film in place of the PBS 13 having a polarizing plate in FIG. 1, and a photodetector 37 having a front monitor in place of the photodetector 17 in FIG. 1. The PBS 36 has a polarizing plate 36a and a reflective film 36b. The PBS 36 is disposed such that polarizing plate 36a is positioned on the opposite side to the semiconductor laser device 11, i.e., on the same side as the optical disc 10. The PBS 36 is formed in a trapezoidal shape, wherein a surface having the reflective film 36b is inclined. The surface having the reflective film 36b is positioned in a direction in which the body of the PBS 36 reflects a laser beam incident thereon from the collimator lens 12.

A laser beam emitted from the semiconductor laser device 11 reaches the PBS 36 through the collimator lens 12. The PBS 36 passes therethrough most (for example, 90%) of a P-polarization component of the incident laser beam, and reflects a portion (for example, 10%) of the P-polarization component on a polarization separating plane 36c. Also, the PBS 36 passes therethrough a portion (for example, 10%) of an S-polarization component of the incident laser beam, and reflects most (for example, 90%) of the S-polarization component on the polarization separating plane 36c. The polarizing plate 36a converts the laser beam passing therethrough from linearly polarized light to circularly polarized light.

The laser beam passing through the PBS 36 having the polarizing plate 36a reaches the disc 10 through the objective lens 14, and is reflected by the recording surface of the disc 10. The laser beam reflected by the recording surface of the disc 10 returns to the PBS 36 through the objective lens 14 and the polarizing plate 36a. The polarizing plate 36a converts the reflected laser beam from circularly polarized light to linearly polarized light. The PBS 36 reflects the returning laser beam on the polarization separating surface 36c, and the reflected laser beam reaches a light receiving surface of the photodetector 37 for RF detection through the condenser lens 15 and the multi-lens 16.

A portion of the P-polarization component and most of the S-polarization component of the laser beam incident on the PBS 36 through the collimator lens 12 are reflected by the body of the PBS 36. The reflected laser beam is reflected by the reflective film 36b, passes through the polarization separating plane 36c in the PBS 36, and reaches the light receiving surface of the photodetector 37 for front monitor through the condenser lens 15. When the reflective film 36b is a film which does not change polarization of the reflected laser beam against the incident laser beam, the S-polarization component of the laser beam reflected by the reflective film 36b is attenuated to approximately 1/10 while it passes through the PBS 36, so that this component can be substantially ignored. Thus, the photodetector 37 generates a front monitor signal corresponding to the light intensity of the laser beam, substantially consisting only of the P-polarization component, which has been irradiated to the light receiving surface for front monitor. The front monitor signal is amplified by the head amplifier 21, and then supplied to the APC 22.

The operations of the APC 22 and the microcomputer 24 are identical to those in the device illustrated in FIG. 1, so that description thereon is omitted here.

While the respective embodiments of the present invention have been described for a so-called infinite optical system which converts a laser beam emitted from a light source, which is divergent light, to collimated light by a collimator lens, the present invention is not limited to such specific embodiments, but can be applied to a finite optical system which omits the collimator lens and does not involve the conversion to collimated light.

As described above, the optical pickup apparatus according to the present invention can stably control the light intensity of a laser beam emitted from a light source in a simple configuration even if the polarization plane of the laser beam rotates.

This application is based on Japanese Patent Application No. 2000-303075 which is hereby incorporated by reference.

What is claimed is:

1. A laser light intensity controller for controlling a light intensity of a laser beam emitted from a light source of an optical apparatus, comprising:

a polarization separating device for passing therethrough a first portion of a first polarization component of the laser beam emitted from said light source and for reflecting a second portion of the first polarization component as monitoring light;

a first light receiving device for receiving said monitoring light reflected by said polarization separating device to generate a first light intensity signal indicative of the received light intensity; and a driving device for driving said light source in accordance with said first light intensity signal, wherein said first light receiving device reflects a second polarization component; which is a component perpendicular to the first polarization component, of the laser beam emitted from said light source an is not sensitive to the second polarization component, and wherein said first light receiving device absorbs the first polarization component and is sensitive to the first polarization component.

2. A laser light intensity controller according to claim 1, further comprising a converting device disposed between said light source and said polarization separating device for converting the laser beam emitted from said light source to a collimated beam.

3. A laser light intensity controller according to claim 2, wherein said polarization separating device reflects a first portion of the second polarization component in the collimated beam output from said converting device in a direction of said monitoring light, and passes therethrough a second portion of the second polarization component, and said laser light intensity controller further comprises:

a second light receiving device for receiving the second polarization component reflected by said first light receiving device to generate a second light intensity signal indicative of the received light intensity; and a control device for calculating an effective output laser beam power of said light source in accordance with said first and second light intensity signals, and for controlling said driving device such that the effective output laser beam power is smaller than a maximum rated power of said light source.

4. A laser light intensity controller according to claim 2, wherein said converting device is a collimator lens.

5. A laser light intensity controller according to claim 1, wherein said polarization separating device is a polarizing beam splitter.

6. A laser light intensity controller according to claim 1, wherein said light receiving device includes a photodiode which has a surface covered with a transparent acrylic plate.

7. A laser light intensity controller according to claim 1, wherein said driving device drives said light source such that said first light intensity signal is at a reference level.

8. A laser light intensity controller according to claim 7, wherein said reference level is variable.

9. A laser light intensity controller according to claim 1, wherein said optical apparatus is an optical pickup apparatus.

10. A laser light intensity controller for controlling a light intensity of a laser beam emitted from a light source of an optical apparatus, comprising:

a first polarization separating device for passing therethrough a first portion of a first polarization component of the laser beam emitted from said light source and a first portion of a second polarization component, which is a component perpendicular to the first polarization component, of the laser beam emitted from said light source and for reflecting a second portion of the first polarization component and a second portion of the second polarization component as monitoring light;

a second polarization separating device for separating the first polarization component and the second polarization component from said monitoring light;

a first light receiving device for receiving the first polarization component separated by said second polarization separating device to generate a first light intensity signal indicative of the received light intensity;

a second light receiving device for receiving the second polarization component separated by said second polarization separating device to generate a second light intensity signal indicative of the received light intensity;

a driving device for driving said light source in accordance with said first light intensity signal; and a control device for calculating an effective output laser beam power of said light source in accordance with said first and second light intensity signals to control said driving device such that the effective output laser beam power is smaller than a maximum rated power of said light source.

11. A laser light intensity controller according to claim 10, further comprising a converting device disposed between said light source and said first polarization separating device for converting the laser beam emitted from said light source to a collimated beam.

12. A laser light intensity controller according to claim 10, wherein said second polarization separating device is a polarizing beam splitter.

13. A laser light intensity controller according to claim 10, wherein said second polarization separating device is a Wollaston prism.

14. A laser light intensity controller according to claim 10, wherein said optical apparatus is an optical pickup apparatus.

15. A laser light intensity controller for controlling a light intensity of a laser beam emitted from a light source of an optical apparatus, comprising:

a polarizing beam splitter for passing therethrough a first portion of a first polarization component of the laser beam emitted from said light source and for reflecting a second portion of the first polarization component on a polarization separating plane as monitoring light;

a reflecting member formed on a surface of said polarizing beam splitter, said surface being located on a path along which said monitoring light travels, for reflecting said monitoring light such that the reflected monitoring light exits from said polarizing beam splitter through said polarization separating plane;

a light receiving device for receiving said monitoring light output from said polarizing beam splitter to generate a light intensity signal indicative of the received light intensity; and a driving device for driving said light source in accordance with said light intensity signal.

16. A laser light intensity controller according to claim 15, further comprising a converting device disposed between said light source and said polarizing beam splitter for converting the laser beam emitted from said light source to a collimated beam.

17. A laser light intensity controller according to claim 15, wherein said reflecting member comprises a reflective film formed on the surface of said polarizing beam splitter, said surface being located on the path along which said monitoring light travels.

18. A laser light intensity controller according to claim 17, wherein said surface in said polarizing beam splitter located on the path along which said monitoring light travels is inclined with respective to a symmetric plane.

19. A laser light intensity controller according to claim 15, wherein said light receiving device is formed integrally with a photodetector of said optical apparatus.

20. A laser light intensity controller according to claim 15, wherein said optical apparatus is an optical pickup apparatus.

21. A laser light intensity controller according to claim 1, wherein said first polarization component is an x-direction polarization component perpendicular to a direction in which a laser beam emitted from said light source travels and said second polarization component is a y-direction polarization component parallel with the traveling direction of the laser beam.

22. A laser light intensity controller according to claim 1, wherein said first polarization component is a y-direction polarization component parallel to a direction in which a laser beam emitted from said light source travels and said second polarization component is an x-direction polarization component perpendicular to the traveling direction of the laser beam.

23. A laser light intensity controller according to claim 1, wherein said first portion of the first polarization component is approximately 90% and said second portion of the first polarization component is approximately 10%.

24. A laser light intensity controller according to claim 3, wherein said first portion of the second polarization component is approximately 90% and said second portion of the second polarization component is approximately 10%.

25. A laser light intensity controller according to claim 10, wherein said first polarization component is an x-direction polarization component perpendicular to a direction in which a laser beam emitted from said light source travels and said second polarization component is a y-direction polarization component parallel with the traveling direction of the laser beam.

26. A laser light intensity controller according to claim 10, wherein said first polarization component is a y-direction polarization component parallel to a direction in which a laser beam emitted from said light source travels and said second polarization component is an x-direction polarization component perpendicular to the traveling direction of the laser beam.

27. A laser light intensity controller according to claim 10, wherein said first portion of the first polarization component is approximately 90%, said first portion of the second polarization component is approximately 10%, said second portion of the first polarization component is approximately 10% and said second portion of the second polarization component is approximately 90%.

28. A laser light intensity controller according to claim 15, wherein said first polarization component is an x-direction polarization component perpendicular to a direction in which a laser beam emitted from said light source travels.

29. A laser light intensity controller according to claim 15, wherein said first polarization component is a y-direction polarization component parallel to a direction in which a laser beam emitted from said light source travels.

30. A laser light intensity controller according to claim 15, wherein said first portion of the first polarization component is approximately 90% and said second portion of the first polarization component is approximately 10%.

\* \* \* \* \*